July 28, 1931. H. G. JANCSY 1,816,585
REFRIGERATING APPARATUS
Filed April 2, 1929
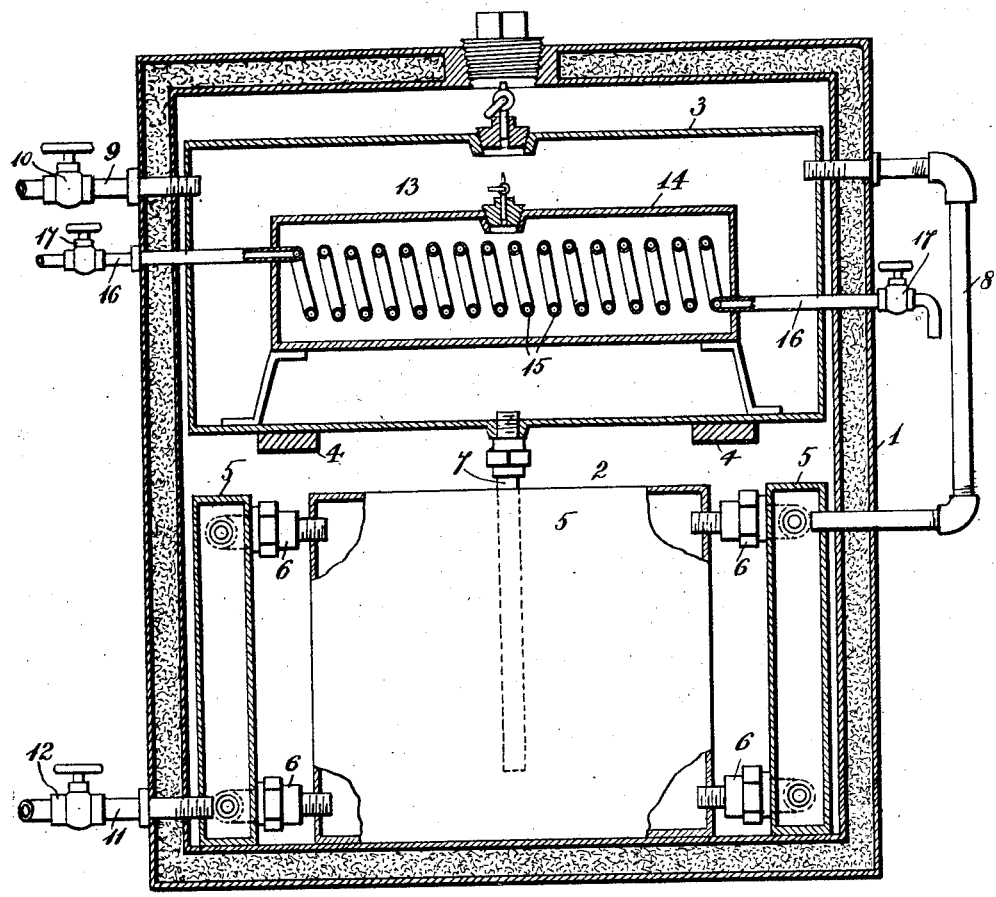
INVENTOR:
Henry G. Jancsy
By John E. R. Hayes
ATTORNEY Patented July 28, 1931

1,816,585

UNITED STATES PATENT OFFICE

HENRY G. JANCSY, OF EVERETT, MASSACHUSETTS

REFRIGERATING APPARATUS

Application filed April 2, 1929. Serial No. 352,006.

The invention relates to a refrigerating or cooling apparatus especially adapted for installation in a truck or wagon for keeping properly cool articles therein during transportation, such as ice cream.

The apparatus is essentially an improvement over that shown and described in my co-pending application now Patent No. 1,722,578 of July 30, 1929, in which the truck or wagon is equipped with a cooling unit including a tank containing a considerable body of refrigerant and coupled to the tank a hollow cooling fixture into and through which the refrigerant will circulate from the tank by thermosiphonic action. With the truck or wagon thus equipped a refrigerant from an outside source and cooled by any type of refrigerating machine is circulated through the cooling unit until such time as it and the walls of the insulated compartment, within which it is shown contained, are thoroughly chilled after which the enforced circulation of the refrigerant is stopped and the cooling unit left filled with the cold refrigerant, and afterward circulation of the refrigerant will continue throughout the unit when the temperature in the fixture exceeds that of the tank, in accordance with the principles of thermosiphonic circulation to which the parts are made adaptable.

While the method and apparatus described in my said application are efficient for cooling purposes and will remain efficient for a protracted period of time even under adverse conditions, the purpose of the present invention is essentially to improve upon it by lengthening the time through which the efficiency of the apparatus may be maintained.

The invention can best be seen and understood by reference to the drawing, in which—

The figure is a cross section of the apparatus or such portion thereof as is necessary for a proper understanding of the invention.

1 represents the insulated casing on the truck or wagon which surrounds the cooling unit and within which is, also, contained the compartment 2 in which the articles to be kept cold are placed. Located within the top of the insulated casing is a tank 3 capable of containing a relatively large body of liquid refrigerant. The tank is supported by crossbars 4 connected to the casing and on which the tank rests. Associated with the tank 3 and located in the lower portion of the insulated casing resting on the bottom thereof and occupying a position in surrounding relation to articles placed in the compartment 2, is a cooling fixture preferably in the form of a number of hollow metal plates 5. These hollow plates are connected at the top and bottom respectively by pipe connections 6. Extending from the bottom of the tank 3 is a pipe connection 7 which extends into the interior of one of the hollow plates preferably to a point well down inside it terminating at a point removed from the bottom of the plate. Extending from the top of one of the hollow plates, and preferably one of the plates other than that into which the pipe connection 7 is extended, is a pipe connection 8 which connects with the side of the tank below its top, leaving a space between the point where this connection enters the tank and the top wall of the tank. Extending from the side of the tank through the casing is a pipe connection 9 having a valve 10 in it. Extending from the side of one of the hollow plates 5 is a pipe connection 11 having a valve 12 in it. With a cooling unit thus arranged and equipped, pipe connections leading from any suitable apparatus are temporarily coupled onto the pipe connections 9 and 11 respectively and, the valves 10 and 12 being opened, a liquid refrigerant is circulated through the tank and fixture beneath it until the refrigerant has reached the desired low temperature, and also until the cooling unit and walls of the insulated casing within which it is contained are thoroughly cool or cooled to the low temperature of the refrigerant circulated through the unit. This having been accomplished, the temporary connections made with the pipes 9 and 11 for circulating the refrigerant are removed, and the valves 10 and 12 closed, leaving the cooling unit filled with the refrigerant. Thereupon the contained refrigerant in the tank and cooling fixture will circulate by thermosiphonic action keeping cold the compartment 2 in which the articles to be kept cold are placed.

The various parts thus far described and their operation are substantially like that referred to in my said patent to which reference is hereby made for a more detailed description. As described, also, in said patent, any well known liquid refrigerant may be used of which a refrigerant composed of equal parts of alcohol and water is especially good. In other words, a refrigerant is employed which will maintain its fluid state even at a low temperature approaching or below the zero point in order that the circulation of the fluid may be maintained.

The purpose of the present invention is to improve upon the apparatus thus far described by lengthening the time in which its cooling efficiency may be maintained. This is accomplished by placing an auxiliary closed tank or cell 13 within the tank 3 or main tank. Contained within the auxiliary tank is a liquid capable of being frozen by the liquid refrigerant passed through the main tank. This liquid may be water or it may be a liquid refrigerant which is capable of being frozen at a higher temperature than that at which the refrigerant in the main tank would become frozen.

The advantage of thus providing an ice-containing tank or cell in the main tank is that an appreciable gain is obtained in the length of time that the refrigerant in the main tank and cooling fixture associated with it will be kept cold for the reason that it will take 144 British thermal units to melt one pound of ice where it takes but one British thermal unit to raise one pound of water one degree.

Instead of freezing the liquid or refrigerant in the auxiliary tank by the refrigerant passed through the main tank, the freezing of the liquid or refrigerant in the auxiliary tank may be obtained by running a coil or pipe 15 through the auxiliary tank with ends 16 extending outside the insulated casing with valves 17 in them. To these ends thus extending connections may be made with any suitable refrigerating apparatus and, on opening the valves, a refrigerant may be passed through the coil, freezing the liquid in the auxiliary tank. With a coil in the auxiliary tank a refrigerant may be passed through the coil at the same time that it is being passed through the main tank, thus diminishing the time it would take to freeze the contained liquid in the auxiliary tank. As said before, however, I prefer to dispense with the coil in the auxiliary tank and to freeze the liquid therein only by the passage of the refrigerant through the main tank.

Having thus fully described my invention, I claim and desire to secure by Letters Patent of the United States:—

1. A cooling apparatus comprising an insulated casing having within it a cooling compartment, a cooling fixture arranged inside the casing in cooling relation to said compartment, a main tank for containing a body of refrigerant located within the casing above said fixture, pipe connections between the main tank and the cooling fixture whereby a thermosiphonic circulation will be established between the tank and fixture for refrigerant contained therein, an auxiliary tank located within the main tank, a liquid in the auxiliary tank freezable by a refrigerant circulated through the main tank, and valve-controlled connections leading from the main tank and cooling fixtures respectively with extension through the insulated casing whereby a refrigerant may be circulated through said main tank and cooling fixture from a point outside said casing to freeze the liquid in the auxiliary tank and afterward be left in the main tank and cooling fixture to circulate therein by thermosiphonic action as aforesaid.

2. A cooling apparatus comprising an insulated casing having within it a cooling compartment, a cooling fixture arranged inside the casing in cooling relation to said compartment, a main tank for containing a body of refrigerant located within the casing above said fixture, pipe connections between the main tank and the cooling fixture whereby a thermosiphonic circulation will be established between the tank and fixture for refrigerant contained therein, an auxiliary tank located within the main tank, a liquid within the auxiliary tank freezable by a refrigerant passed through it, valve-controlled means leading from outside the insulated casing with extension through the liquid in the auxiliary tank whereby a refrigerant may be passed through it for freezing said liquid, and valve-controlled connections leading from the tank and cooling fixture respectively with extension through the insulated casing whereby a refrigerant may be circulated through said main tank and cooling fixture from a point outside said casing assisting in freezing the liquid in the auxiliary tank and afterward the refrigerant be left in the main tank and cooling fixture to circulate therein by thermosiphonic action as aforesaid.

HENRY G. JANCSY.